US010235808B2

(12) United States Patent
Chen et al.

(10) Patent No.: US 10,235,808 B2
(45) Date of Patent: Mar. 19, 2019

(54) COMMUNICATION SYSTEM

(71) Applicant: Microsoft Technology Licensing, LLC, Redmond, WA (US)

(72) Inventors: Henry Yao-Tsu Chen, Woodinville, WA (US); Brandon V. Taylor, Mercer Island, WA (US); Mark Robert Swift, Mercer Island, WA (US); Austin S. Lee, Pittsburgh, PA (US); Ryan S. Menezes, Woodinville, WA (US); Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/138,995

(22) Filed: Apr. 26, 2016

(65) Prior Publication Data

US 2017/0053446 A1 Feb. 23, 2017

Related U.S. Application Data

(60) Provisional application No. 62/207,706, filed on Aug. 20, 2015.

(51) Int. Cl.
*G06T 19/00* (2011.01)
*H04N 7/15* (2006.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
None
See application file for complete search history.

(56) References Cited

U.S. PATENT DOCUMENTS 6,119,147 A 9/2000 Toomey et al.
6,317,127 B1 11/2001 Daily et al.
(Continued)

FOREIGN PATENT DOCUMENTS

CN 103593867 2/2014
EP 2530588 12/2012
(Continued)

OTHER PUBLICATIONS

"3DF Zephyr", Available at: http://www.3dflow.net/3df-zephyr-pro-3d-models-from-photos/, Apr. 5, 2015, 6 pages.
(Continued)

*Primary Examiner* — Kyle Zhai
(74) *Attorney, Agent, or Firm* — Newport IP, LLC; Scott Y. Shigeta

(57) ABSTRACT

A user device comprises a network interface, a rendering module, and a scene modification module. The network interface is configured to receive a video signal from another device via a network. The rendering module is configured to control display apparatus of the user device to display a virtual element to a user of the user device, the virtual element comprising a video image derived from the video signal. The modification module is configured to generate rendering data for displaying a modified version of the virtual element at the other device. The modified version does not include said video image. The network interface is configured to transmit the rendering data to the other device via the network. Alternatively or in addition, the rendering data can be modified at the other device to the same end.

20 Claims, 5 Drawing Sheets

(51) Int. Cl.
| | |
|---|---|
| *G02B 27/01* | (2006.01) |
| *G06F 3/01* | (2006.01) |
| *G06F 3/14* | (2006.01) |
| *G06F 3/16* | (2006.01) |
| *G06T 19/20* | (2011.01) |
| *H04N 7/14* | (2006.01) |

(52) U.S. Cl.
CPC ............ *G06F 3/013* (2013.01); *G06F 3/1454* (2013.01); *G06F 3/16* (2013.01); *G06T 19/20* (2013.01); *H04N 7/142* (2013.01); *H04N 7/15* (2013.01); *G02B 2027/0134* (2013.01); *G06T 2219/024* (2013.01); *G06T 2219/2021* (2013.01)

(56) References Cited

U.S. PATENT DOCUMENTS

| | | | |
|---|---|---|---|
| 7,010,158 | B2 | 3/2006 | Cahill |
| 8,274,550 | B2 | 9/2012 | Steuart |
| 8,493,206 | B2 | 7/2013 | Richey et al. |
| 8,554,307 | B2 | 10/2013 | Razzaque et al. |
| 8,624,924 | B2 | 1/2014 | Dobbins et al. |
| 8,737,721 | B2 | 5/2014 | Arcas et al. |
| 8,814,691 | B2 | 8/2014 | Haddick et al. |
| 8,884,984 | B2 | 11/2014 | Flaks et al. |
| 8,922,481 | B1 | 12/2014 | Kauffmann et al. |
| 8,982,110 | B2 | 3/2015 | Saban et al. |
| 9,049,469 | B2 | 6/2015 | Melzer |
| 9,088,787 | B1 | 7/2015 | Smith et al. |
| 9,111,134 | B1* | 8/2015 | Rogers ............... G06K 9/00302 |
| 9,280,258 | B1 | 3/2016 | Bailly et al. |
| 9,294,757 | B1 | 3/2016 | Lewis et al. |
| 9,686,466 | B1* | 6/2017 | Billinghurst ....... H04N 5/23238 |
| 2002/0075201 | A1 | 6/2002 | Sauer et al. |
| 2003/0137506 | A1 | 7/2003 | Efran et al. |
| 2004/0104935 | A1 | 6/2004 | Williamson et al. |
| 2006/0012596 | A1 | 1/2006 | Fukuya |
| 2007/0198534 | A1 | 8/2007 | Hon et al. |
| 2008/0034038 | A1* | 2/2008 | Ciudad ................ G06Q 10/107 709/204 |
| 2009/0221368 | A1 | 9/2009 | Yen et al. |
| 2011/0043644 | A1 | 2/2011 | Munger et al. |
| 2011/0181591 | A1 | 7/2011 | Benitez et al. |
| 2011/0214082 | A1 | 9/2011 | Osterhout et al. |
| 2011/0258526 | A1 | 10/2011 | Supakkul et al. |
| 2011/0285811 | A1 | 11/2011 | Langlotz et al. |
| 2011/0310120 | A1 | 12/2011 | Narayanan |
| 2011/0310227 | A1 | 12/2011 | Konertz et al. |
| 2012/0019614 | A1 | 1/2012 | Murray et al. |
| 2012/0069051 | A1 | 3/2012 | Hagbi et al. |
| 2012/0113138 | A1 | 5/2012 | Uusitalo et al. |
| 2012/0169838 | A1* | 7/2012 | Sekine .................. H04N 7/144 348/14.16 |
| 2012/0194706 | A1 | 8/2012 | Kwak |
| 2012/0224070 | A1 | 9/2012 | Burroff |
| 2012/0249741 | A1 | 10/2012 | Maciocci et al. |
| 2012/0299962 | A1 | 11/2012 | White et al. |
| 2012/0327119 | A1 | 12/2012 | Woo et al. |
| 2013/0004060 | A1 | 1/2013 | Bell et al. |
| 2013/0031457 | A1 | 1/2013 | Griffiths et al. |
| 2013/0091432 | A1 | 4/2013 | Shet et al. |
| 2013/0222369 | A1 | 8/2013 | Huston et al. |
| 2013/0229535 | A1 | 9/2013 | Nakamura |
| 2014/0002490 | A1 | 1/2014 | Teegan |
| 2014/0053077 | A1 | 2/2014 | Unnikrishnan et al. |
| 2014/0091984 | A1* | 4/2014 | Ashbrook ............. G06F 3/1462 345/2.1 |
| 2014/0092135 | A1 | 4/2014 | McArdle et al. |
| 2014/0104378 | A1 | 4/2014 | Kauff et al. |
| 2014/0125757 | A1 | 5/2014 | Lee et al. |
| 2014/0152660 | A1 | 6/2014 | Lee et al. |
| 2014/0176661 | A1 | 6/2014 | Smurro et al. |
| 2014/0204077 | A1 | 7/2014 | Kamuda et al. |
| 2014/0204119 | A1 | 7/2014 | Malamud et al. |
| 2014/0210856 | A1 | 7/2014 | Finn et al. |
| 2014/0229835 | A1 | 8/2014 | Ravine |
| 2014/0240444 | A1 | 8/2014 | Szymczyk et al. |
| 2014/0241617 | A1 | 8/2014 | Shotton et al. |
| 2014/0327730 | A1* | 11/2014 | Wiener .................. G10L 25/57 348/14.09 |
| 2015/0002636 | A1 | 1/2015 | Brown |
| 2015/0054913 | A1 | 2/2015 | Annua et al. |
| 2015/0062123 | A1 | 3/2015 | Yuen |
| 2015/0145985 | A1 | 5/2015 | Gourlay et al. |
| 2015/0156147 | A1 | 6/2015 | Liu |
| 2015/0206343 | A1 | 7/2015 | Mattila |
| 2015/0301592 | A1 | 10/2015 | Miller |
| 2015/0362733 | A1 | 12/2015 | Spivack |
| 2016/0253844 | A1 | 9/2016 | Petrovskaya et al. |
| 2016/0255126 | A1* | 9/2016 | Sarris .................. H04L 65/1096 348/14.08 |
| 2016/0293133 | A1 | 10/2016 | Dutt |
| 2017/0053445 | A1 | 2/2017 | Chen et al. |
| 2017/0053455 | A1 | 2/2017 | Chen et al. |
| 2017/0053621 | A1 | 2/2017 | Chen et al. |
| 2017/0054815 | A1 | 2/2017 | Chen et al. |

FOREIGN PATENT DOCUMENTS

| | | |
|---|---|---|
| WO | WO-2012020242 | 2/2012 |
| WO | WO-2014206473 | 12/2014 |

OTHER PUBLICATIONS

"6+ More Google Street View Alternatives", Available at: http://www.weboffspring.com/333/6-more-google-street-view-alternatives, Mar. 16, 2010, 4 pages.

"A New Spin for Photosynth", Available at: http://research.microsoft.com/en-us/news/features/photosynth-010714.aspx, Jan. 7, 2014, 3 pages.

"Insight3d—Quick Tutorial", Available at: http://insight3d.sourceforge.net/insight3d_tutorial.pdf, Dec. 29, 2009, 13 pages.

"Microsoft HoloLens", Available at: https://www.microsoft.com/microsoft-hololens/en-us/experience, Aug. 14, 2015, 13 pages.

"What Should I Do If I Want to Make 3D Panorama Photos", Available at: http://www.arcsoft.com/topics/panorama-maker/how-to-create-3d-panorama.html, Dec. 24, 2011, 3 pages.

Baldwin,"Dropbox buys 3D Photo-Stitching App Bubbli with Plans to Integrate Technology", Available at: http://thenextweb.com/apps/2014/05/21/dropbox-buys-3d-photo-stitching-app-bubbli/, May 21, 2014, 7 pages.

Bargeron,"Annotations for Streaming Video on the Web:System Design and Usage Studies", In TechReport MSR-TR-98-60, Mar. 1999, 8 pages.

Bright,"Hands-on: Microsoft's HoloLens is flat-out magical", Available at: http://arstechnica.com/gadgets/2015/01/hands-on-with-hololens-making-the-virtual-real/, Jan. 22, 2015, 5 pages.

Chen,"Asynchronous 3D Annotation of a Video Sequence", U.S. Appl. No. 62/207,694, filed Aug. 20, 2015., 73 pages.

Chen,"Asynchronous Session on Hololens", U.S. Appl. No. 62/207,727, filed Aug. 20, 2015., 74 pages.

Chen,"Communication System", U.S. Appl. No. 62/207,706, filed Aug. 20, 2015., 40 pages.

Chen,"Roundtrip Reintegration of Asynchronous 3D Session into Hololens Space", U.S. Appl. No. 62/207,732, filed Aug. 20, 2015., 71 pages.

Duval,"What's up with Stereographic 3D Panoramic Video", Available at: http://www.video-stitch.com/whats-stereographic-3d-panoramic-video/, Feb. 2, 2014, 12 pages.

Guerreiro,"Beyond Post-It: Structured Multimedia Annotations for Collaborative VEs", In Proceedings of International Conference on Artificial Reality and Telexistence Eurographics Symposium on Virtual Environments, Dec. 8, 2014, 8 pages.

Heer,"Voyagers and Voyeurs: Supporting Asynchronous Collaborative Visualization", In Proceedings of communications of the ACM, vol. 52, Issue 1, Jan. 2009, pp. 87-97.

(56) References Cited

OTHER PUBLICATIONS

Kato,"Marker Tracking and HMD Calibration for a Video-based Augmented Reality Conferencing System", In Proceedings. 2nd IEEE and ACM International Workshop on Augmented Reality, Oct. 20, 1999, 10 pages.
Kiyokawa,"An Occlusion-Capable Optical See-through Head Mount Display for Supporting Co-located Collaboration", In the Second IEEE and ACM International Symposium on Mixed and Augmented Reality, Oct. 7, 2003, 9 pages.
Kleinermann,"Adding Semantic Annotations, Navigation paths and Tour Guides to Existing Virtual Environments", In Proceedings of 13th International Conference of Virtual Systems and Multimedia, Sep. 23, 2007, 12 pages.
Langlotz,"Audio Stickies: Visually-guided Spatial Audio Annotations on a Mobile Augmented Reality Platform", In Proceedings of the 25th Australian Computer-Human Interaction Conference: Augmentation, Application, Innovation, Collaboration, Nov. 25, 2013, pp. 545-554.
Lee,"Augmented Reality", U.S. Appl. No. 62/207,675, filed Aug. 20, 2015, 51 pages.
Minatani,"Face-to-Face Tabletop Remote Collaboration in Mixed Reality", In Proceedings of 6th IEEE and ACM International Symposium on Mixed and Augmented Reality, Nov. 13, 2007, 4 pages.
Pradeep,"Microsoft Has a Holographic TV Studio to Develop Holographic Content for HoloLens", Available at: http://microsoft-news.com/microsoft-has-a-holographic-tv-studio-to-develop-holographic-content-for-hololens/, May 23, 2015, 4 pages.
Preibisch,"Stitching 2D/3D", Available at: http://fiji.sc/Stitching_2D/3D, Oct. 2008, 6 pages.
Rose,"Annotating Real-World Objects Using Augmented Reality", In Technical Report, Jun. 1995, 21 pages.
Tait,"A Projected Augmented Reality System for Remote Collaboration", In Proceedings of IEEE International Symposium on Mixed and Augmented Reality, Oct. 1, 2013, 6 pages.
Uva,"Augmented Reality integration in Product Development", In Proceedings of International conference on Innovative Methods in Product Design, Jun. 15, 2011, pp. 73-79.
Uva,"Distributed Design Review Using Tangible Augmented Technical Drawings", In Journal of Computer-Aided Design, vol. 42, Issue 5, 2010, pp. 364-372.
Verlinden,"Recording Augmented Reality Experiences to Capture Design Reviews", In International Journal for Interactive Design and Manufacturing, vol. 3, Jul. 10, 2009, pp. 189-200.
Wang,"Tangible Mixed Reality for Remote Design Review: A Study Understanding User Perception and Acceptance", In Journal of Visualization in Engineering, August, Aug. 2013, pp. 1-15.
"International Search Report and Written Opinion", Application No. PCT/US2016/047665, dated Nov. 21, 2016, 10 pages.
"International Search Report and Written Opinion", Application No. PCT/US2016/047663, dated Oct. 31, 2016, 11 pages.
"International Search Report and Written Opinion", Application No. PCT/US2016/047666, dated Nov. 25, 2016, 15 pages.
"Microsoft Hololens Trailer—Sec 1:08-1:13", T6Games Youtube Channel—Retrieved from the Internet: https://www.youtube.com/watch?v=bpXVuRuISHw, Jan. 22, 2015, 4 pages.
"UAB does virtual surgery with VIPAAR and Google Glass", Retrieved at: https://www.youtube.com/watch?v=aTOoBwfqBe0— on Nov. 4, 2016, 2 pages.
Gauglitz,"World-Stabilized Annotations and Virtual Scene Navigation for Remote Collaboration", User Interface Software and Technology ACM, Oct. 5, 2014, 11 pages.
Kasahara,"Second Surface: Multi-user Spatial Collaboration System based on Augmented Reality", Nov. 28, 201, 5 pages.
Lee,"3D Collaboration Method over HoloLens and Skype End Points", Oct. 30, 2015, 4 pages.
Raskar,"The Office of the Future: A Unified Approach to Image-Based Modeling and Spatially Immersive Displays", Proceedings of the 98 SIGGRAPH Conference on Computer Graphics, Jul. 1998, 10 pages.
Riazuelo,"C2TAM: A Cloud framework for Cooperative Tracking and Mapping", Dec. 4, 2013, 14 pages.
Yoon,"Merge the Real World with the Technology World", Daniel Yoon's Blog, Feb. 17, 2015, 3 pages.
"International Search Report and Written Opinion", Application No. PCT/US2016/047664, dated Dec. 7, 2016, 11 pages.
"International Search Report and Written Opinion", Application No. PCT/US2016/047662, Dec. 20, 2016, 11 pages.
"International Preliminary Report on Patentability", Application No. PCT/US2016/047663, dated Jul. 6, 2017, 6 pages.
"Non-Final Office Action", U.S. Appl. No. 15/141,290, dated Jun. 14, 2017, 12 pages.
"Non-Final Office Action", U.S. Appl. No. 15/141,666, dated Jul. 14, 2017, 20 pages.
"Second Written Opinion", Application No. PCT/US2016/047662, dated Jul. 24, 2017, 6 pages.
"Second Written Opinion", Application No. PCT/US2016/047665, dated Jun. 28, 2017, 6 pages.
"Second Written Opinion", Application No. PCT/US2016/047666, dated Jul. 25, 2017, 6 pages.
"Final Office Action", U.S. Appl. No. 15/141,290, dated Feb. 14, 2018, 14 pages.
"Non-Final Office Action", U.S. Appl. No. 15/141,586, dated Dec. 28, 2017, 16 pages.
"Non-Final Office Action", U.S. Appl. No. 15/139,095, dated Sep. 1, 2017, 15 pages.
"International Preliminary Report on Patentability", Application No. PCT/US2016/047662, dated Nov. 2, 2017, 7 pages.
"International Preliminary Report on Patentability", Application No. PCT/US2016/047666, dated Nov. 3, 2017, 7 pages.
"International Preliminary Report on Patentability", Application No. PCT/US2016/047665, dated Nov. 10, 2017, 7 pages.
"Final Office Action", U.S. Appl. No. 15/139,095, dated Apr. 3, 2018, 14 pages.
"Final Office Action", U.S. Appl. No. 15/141,666, dated Apr. 19, 2018, 18 pages.
"International Preliminary Report on Patentability", Application No. PCT/US2016/047664, dated Feb. 20, 2018, 7 pages.
"Final Office Action Issued in U.S. Appl. No. 15/141,586", dated Sep. 10, 2018, 13 Pages.

\* cited by examiner

COMMUNICATION SYSTEM

PRIORITY

This application claims priority under 35 U.S.C. § 111(b) to U.S. Provisional patent application No. 62/207,706, titled "Communication System" and filed on Aug. 20, 2015, the entire disclose of which is incorporated by reference herein.

BACKGROUND

Display systems can used to make a desired image visible to a user. Wearable display systems can be embodied in a wearable headset which is arranged to display an image within a short distance from a human eye. Such wearable headsets are sometimes referred to as head mounted displays. Optical components are arranged in a wearable headpiece so as to display the desired image within a few centimetres of the user's eyes.

Some types of display systems provide a view through this optics so that the generated image which is displayed to the user is overlaid onto a real world view. This is referred to as augmented reality ("AR"), or equivalently mixed reality. An example is the Microsoft HoloLens device.

As well as a wearable display system, an augmented reality device may incorporate other components, such as processing unit(s), computer interface(s) that provide network connectivity, and camera(s) etc. These may be housed in the headpiece, as in the HoloLens, or in a separate housing connected to the headpiece by wireless or wired means.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In a first aspect, a user device comprises a network interface, a rendering module, and a scene modification module. The network interface is configured to receive a video signal from another device via a network. The rendering module is configured to control display apparatus of the user device to display a virtual element to a user of the user device, the virtual element comprising a video image derived from the video signal. The modification module is configured to generate rendering data for displaying a modified version of the virtual element at the other device. The modified version does not include said video image. The network interface is configured to transmit the rendering data to the other device via the network.

In a second aspect, the present subject matter is directed to a method of effecting a shared reality communication event via a communications network between a first user of a first device and a second user of a second device. A shared reality communication event means a communication event in which the first device renders visible to the first user a visual scene by displaying virtual elements, and the second device displays to the second user a version of the visual scene as it is being perceived by the first user (i.e. so that at least a part of the first user's "world" as they perceive it is shared with the second user, in contrast to a conventional video call in which each user would normally see video of each other). Rendering data is received, the rendering data for displaying at the second device a version of a virtual element that is currently being displayed at the first device in the visual scene. It is detected when the rendering data comprises a video image that was captured at the second device and transmitted via the network to the first device. The rendering data is modified to remove said video image. The modified rendering data is provided to a rendering module of the second device, thereby causing the second device to display in its version of the visual scene a modified version of the virtual display element which does not include said video image.

BRIEF DESCRIPTION OF FIGURES

For a better understanding of the subject matter and to show how embodiments of the same may be carried into effect, reference is made to the following figures in which.

DETAILED DESCRIPTION

Figure 1A:
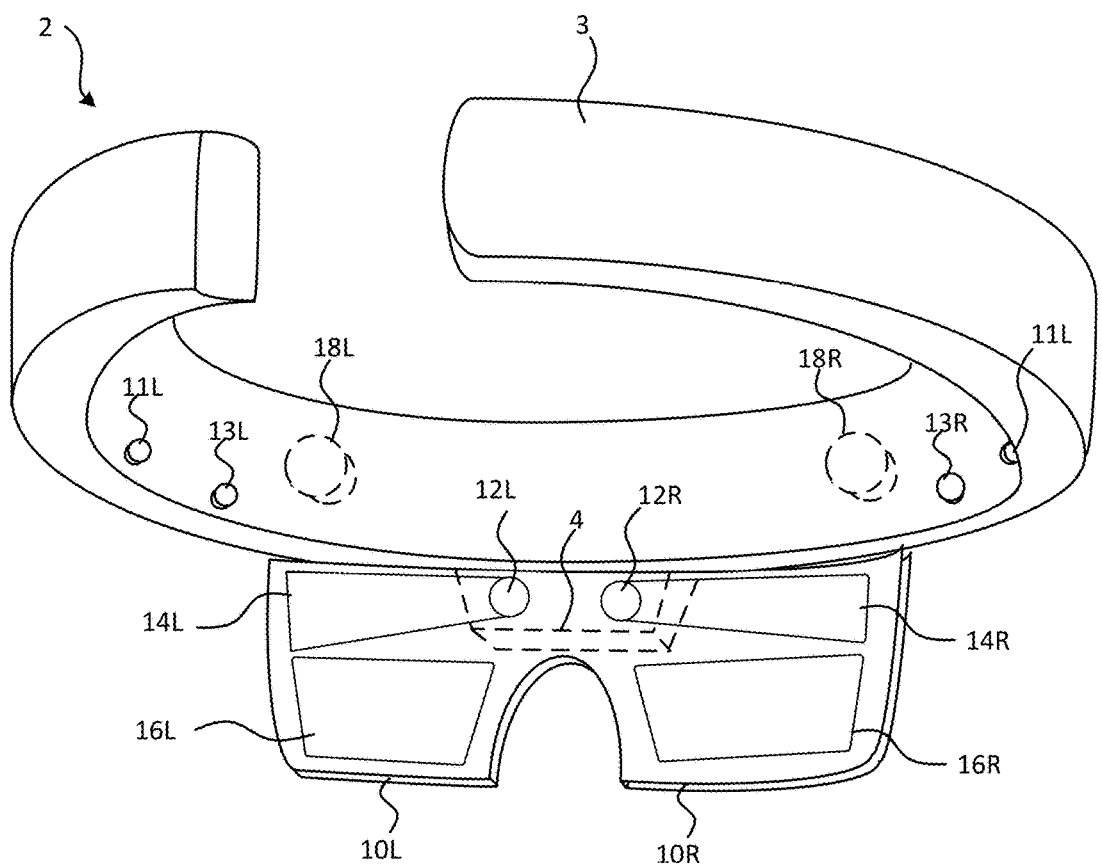
FIG. 1A shows a perspective view of an augmented reality device.
Figure 1B:
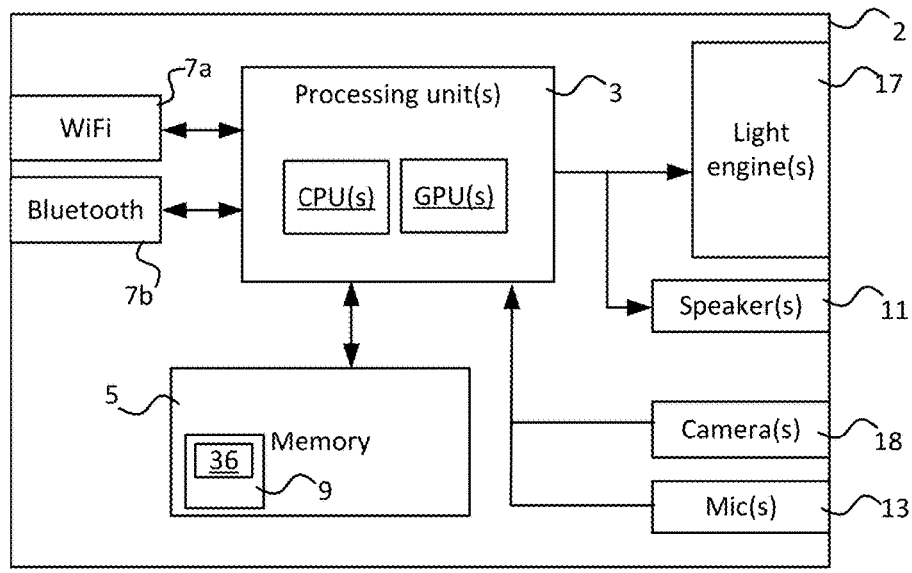
FIG. 1B shows a block diagram of the device.

FIG. 1A shows a perspective view of a wearable augmented reality ("AR") device 2, from the perspective of a wearer 22 of the device 2 ("AR user"). FIG. 1B shows a schematic block diagram of the AR device 2. The AR device 2 is a computer device in the form of a wearable headset. The AR user 22 is not shown in FIGS. 1A or 1B, but is depicted in some of the later figures.

The augmented reality device 2 comprises a headpiece 6, which is a headband, arranged to be worn on the wearer's head. The headpiece 6 has a central portion 4 intended to fit over the nose bridge of a wearer, and has an inner curvature intended to wrap around the wearer's head above their ears.

The headpiece 3 supports left and right optical components, labelled 10L and 10R, which are waveguides. For ease of reference herein an optical component 10 will be considered to be either a left or right component, because the components are essentially identical apart from being mirror images of each other. Therefore, all description pertaining to the left-hand component also pertains to the right-hand component. The central portion 4 houses at least one light engine 17 which is not shown in FIG. 1A but which is depicted in FIG. 1B.

The light engine 17 comprises a micro display and imaging optics in the form of a collimating lens (not shown). The micro display can be any type of image source, such as liquid crystal on silicon (LCOS) displays, transmissive liquid crystal displays (LCD), matrix arrays of LED's (whether organic or inorganic) and any other suitable display. The display is driven by circuitry which is not visible in FIGS. 1A and 1B which activates individual pixels of the display to generate an image. Substantially collimated light, from each pixel, falls on an exit pupil of the light engine 4. At the exit pupil, the collimated light beams are coupled into each optical component, 10L, 10R into a respective in-coupling zone 12L, 12R provided on each component. These in-coupling zones are clearly shown in FIG. 1A. In-coupled light is then guided, through a mechanism that involves diffraction and TIR, laterally of the optical component in a respective intermediate (fold) zone 14L, 14R, and also downward into a respective exit zone 16L, 16R where it exits the component 10 towards the users' eye. The optical component 10 is located between the light engine 13 and the eye i.e. the display system configuration is of so-called transmissive type.

The collimating lens collimates the image into a plurality of beams, which form a virtual version of the displayed image, the virtual version being a virtual image at infinity in the optics sense. The light exits as a plurality of beams, corresponding to the input beams and forming substantially the same virtual image, which the lens of the eye projects onto the retina to form a real image visible to the AR user 22. In this manner, the optical component 10 projects the displayed image onto the wearer's eye. The optical components 10L, 10R and light engine 17 constitute display apparatus of the AR device 2.

The zones 12, 14, 16 can, for example, be suitably arranged diffractions gratings or holograms. The optical component 10 has a refractive index n which is such that total internal reflection takes place to guide the beam from the light engine along the intermediate expansion zone 314, and down towards the exit zone 316.

The optical component 10 is substantially transparent, whereby the wearer can see through it to view a real-world environment in which they are located simultaneously with the projected image, thereby providing an augmented reality experience.

To provide a stereoscopic image, i.e. that is perceived as having 3D structure by the user, slightly different versions of a 2D image can be projected onto each eye—for example from different light engines 17 (i.e. two micro displays) in the central portion 4, or from the same light engine (i.e. one micro display) using suitable optics to split the light output from the single display.

The wearable AR device 2 shown in FIG. 1A is just one exemplary configuration. For instance, where two light-engines are used, these may instead be at separate locations to the right and left of the device (near the wearer's ears). Moreover, whilst in this example, the input beams that form the virtual image are generated by collimating light from the display, an alternative light engine based on so-called scanning can replicate this effect with a single beam, the orientation of which is fast modulated whilst simultaneously modulating its intensity and/or colour. A virtual image can be simulated in this manner that is equivalent to a virtual image that would be created by collimating light of a (real) image on a display with collimating optics. Alternatively, a similar AR experience can be provided by embedding substantially transparent pixels in a glass or polymer plate in front of the wearer's eyes, having a similar configuration to the optical components 10A, 10L though without the need for the zone structures 12, 14, 16.

Other headpieces 6 are also within the scope of the subject matter. For instance, the display optics can equally be attached to the users head using a frame (in the manner of conventional spectacles), helmet or other fit system. The purpose of the fit system is to support the display and provide stability to the display and other head borne systems such as tracking systems and cameras. The fit system can be designed to meet user population in anthropometric range and head morphology and provide comfortable support of the display system.

The AR device 2 also comprises one or more cameras 19—stereo cameras 10L, 10R mounted on the headpiece 3 and configured to capture an approximate view ("field of view") from the user's left and right eyes respectfully in this example. The cameras are located towards either side of the user's head on the headpiece 3, and thus capture images of the scene forward of the device form slightly different perspectives. In combination, the stereo camera's capture a stereoscopic moving image of the real-world environment as the device moves through it. A stereoscopic moving image means two moving images showing slightly different perspectives of the same scene, each formed of a temporal sequence of frames ("video images") to be played out in quick succession to replicate movement. When combined, the two images give the impression of moving 3D structure.

As shown in FIG. 1B, the AR device 2 also comprises: one or more loudspeakers 11; one or more microphones 13; memory 5; processing apparatus in the form of one or more processing units 3 (e.g. CPU(s), GPU(s), and/or bespoke processing units optimized for a particular function, such as AR related functions); and one or more computer interfaces for communication with other computer devices, such as a Wifi interface 7a, Bluetooth interface 7b etc. The wearable device 3 may comprise other components that are not shown, such as dedicated depth sensors, additional interfaces etc.

As shown in FIG. 1A, a left microphone 11L and a right microphone 13R are located at the front of the headpiece (from the perspective of the wearer), and left and right channel speakers, earpiece or other audio output transducers are to the left and right of the headband 3. These are in the form of a pair of bone conduction audio transducers 11L, 11R functioning as left and right audio channel output speakers.

Though not evident in FIG. 1A, the processing apparatus 3, memory 5 and interfaces 7a, 7b are housed in the headband 3. Alternatively, these may be housed in a separate housing connected to the components of the headband 3 by wired and/or wireless means. For example, the separate housing may be designed to be worn or a belt or to fit in the wearer's pocket, or one or more of these components may be housed in a separate computer device (smartphone, tablet, laptop or desktop computer etc.) which communicates wirelessly with the display and camera apparatus in the AR headset 2, whereby the headset and separate device constitute user apparatus in the form of augmented reality apparatus.

The memory holds executable code 9 that the processor apparatus 3 is configured to execute. In some cases, different parts of the code 9 may be executed by different processing units of the processing apparatus 3. The code 9 comprises code of an operating system, as well as code of one or more applications configured to run on the operating system.

Figure 2A:
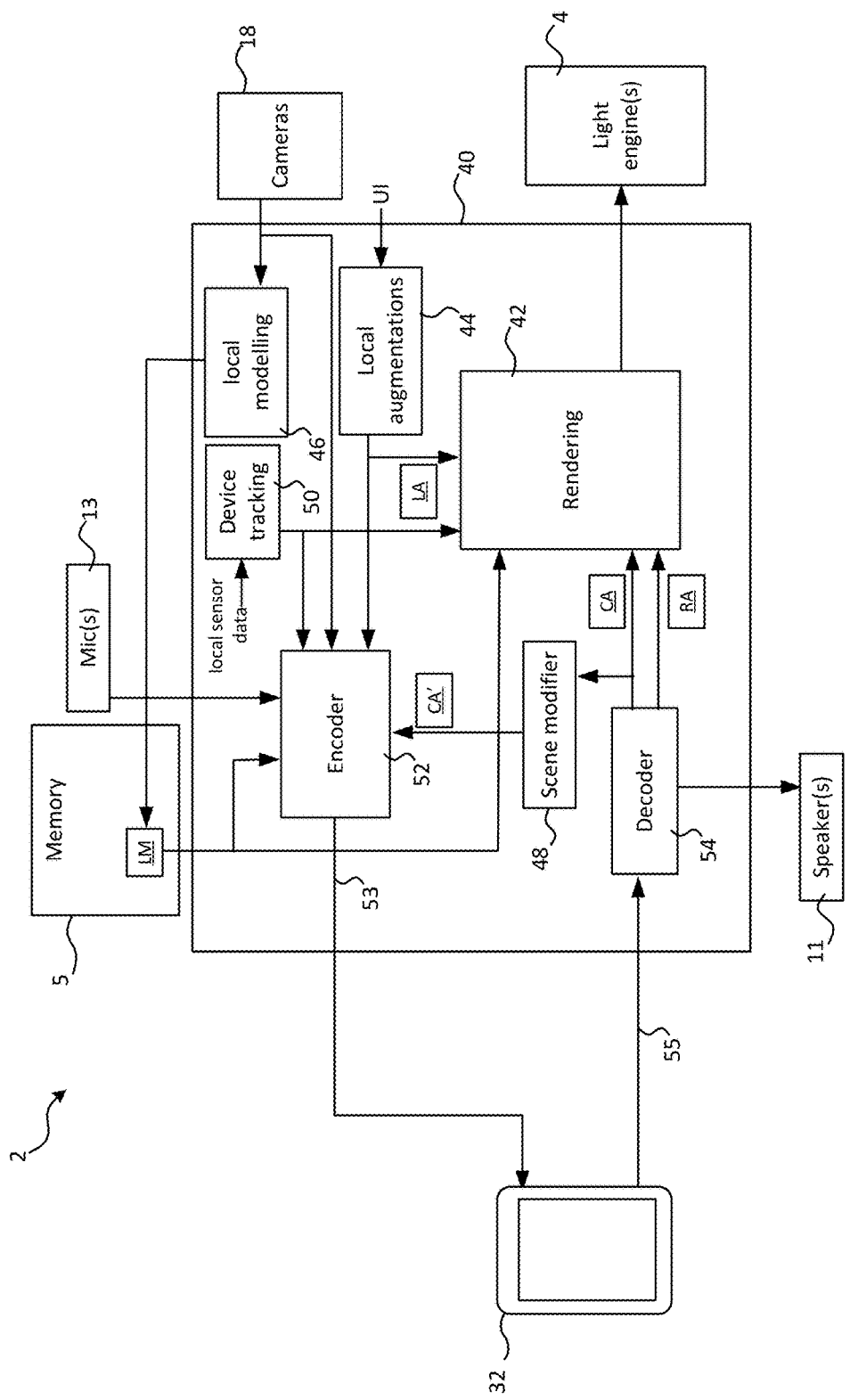
FIG. 2A shows functional modules of an augmented reality device.

FIG. 2A shows a function block diagram of the AR device 2. An AR system 40 is shown, which comprises the following functional modules: a rendering module 42, a local augmentation module 44, a local modelling module 46, a scene modification module 48, a device tracking module 50, an encoder 52, and a decoder 54. Each of these functional modules may be implemented in software, i.e. they may be code modules of the code 9, dedicated hardware of the AR device 2, or a combination of both software and dedicated hardware.

The rendering module 42 controls the light engine(s) 17 to generate a stereoscopic image visible to the wearer, i.e. to generate slightly different 2D images that are projected onto different eyes by the optical components 10L, 10R substantially simultaneously so as to create the impression of 3D structure.

The stereoscopic image is formed by rendering module 42 rendering at least one virtual display element ("augmentation"), which is perceived as a 3D element, i.e. having perceived 3D structure, at a real-world location in 3D space by the AR user.

An augmentation is defined by an augmentation data object stored in the memory 5. The data object comprises: location data defining a desired location in 3D space for the virtual element (e.g. as (x, y, z) Cartesian coordinates); structural data defining 3D surface structure of the virtual element, i.e. a 3D model of the virtual element; and image data defining 2D surface texture of the virtual element to be applied to the surfaces defined by the 3D model. The data object may comprise additional information, such as a desired orientation of the augmentation.

The perceived 3D effects are achieved though suitable rendering of the augmentation data object. To give the impression of the augmentation having 3D structure, a stereoscopic image is generated based on the 2D surface and 3D augmentation model data in the data object, with the augmentation being rendered to appear at the desired location in the stereoscopic image.

A 3D model of the real-world in the vicinity of the AR device 2 is used to give the impression of the real-world having expected tangible effects on the augmentation, in the way that the real-world would a real-world object. The 3D model represents surface structure present in the real world, and the information it provides about this surface structure allows an augmentation to be displayed as though it were a real-world 3D object, thereby providing an immersive augmented reality experience. The 3D model is in the form of 3D mesh.

For example, based on the model of the real-world, an impression can be given of the augmentation being obscured by a real-world object that is in front of its perceived location from the perspective of the user; dynamically interacting with a real-world object, e.g. by moving around the object; statically interacting with a real-world object, say by sitting on top of it etc.

Whether or not real-world surface structure should affect an augmentation can be determined based on suitable rendering criteria. For example, by creating a 3D model of the perceived AR world, which includes the real-world surface structure and any augmentations, and projecting it onto a plane along the AR user's line of sight as determined using pose tracking (see below), a suitable criteria for determining whether a real-world object should be perceived as partially obscuring an augmentation is whether the projection of the real-world object in the plane overlaps with the projection of the augmentation, which could be further refined to account for transparent or opaque real world structures. Generally the criteria can depend on the location and/or orientation of the augmented reality device 2 and/or the real-world structure in question.

An augmentation can also be mapped to the mesh, in the sense that its desired location and/or orientation is defined relative to a certain structure(s) in the mesh. Should that structure move and/or rotate causing a corresponding change in the mesh, when rendered properly this will case corresponding change in the location and/or orientation of the augmentation. For example, the desired location of an augmentation may be on, and defined relative to, a table top structure; should the table be moved, the augmentation moves with it. Object recognition can be used to this end, for example to recognize a known shape of table and thereby detect when the table has moved using its recognizable structure. Such object recognition techniques are known in the art.

An augmentation that is mapped to the mash in this manner, or is otherwise associated with a particular piece of surface structure embodied in a 3D model, is referred to an "annotation" to that piece of surface structure. In order to annotate a piece of real-world surface structure, it is necessary to have that surface structure represented by the 3D model in question—without this, the real-world structure cannot be annotated.

The local modelling module 46 generates a local 3D model "LM" of the environment in the memory 5, using the AR device's own sensor(s) e.g. camera(s) 18 and/or any dedicated depth sensors etc. The local modelling module 46 and sensor(s) constitute sensing apparatus of the AR device 2.

The device tracking module 50 tracks the location and orientation of the AR device 2, using local sensor data captured at the AR device 2. The sensor data can be captured in a number of ways, for example using the cameras 18 and/or other sensor(s) of the AR device 2. The tracking module indicated the current location and orientation of the AR device 2 to the rendering module 42, for example by outputting a current "pose vector" of the AR device. The pose vector is a six dimensional vector, for example (x, y, z, P, R, Y) where (x, y, z) are the device's Cartesian coordinates with respect to a suitable origin, and (P, R, Y) are the device's pitch, roll and yaw with respect to suitable reference axes.

The rendering module 42 adapts the augmentations based on the tracking, to account for the movement of the device i.e. to maintain the perception of the as 3D elements occupying the real-world, for example to ensure that static augmentations appear to remain static (which will in fact be achieved by scaling or rotating them as, from the AR user's perspective, the environment is moving relative to them).

Figure 3:
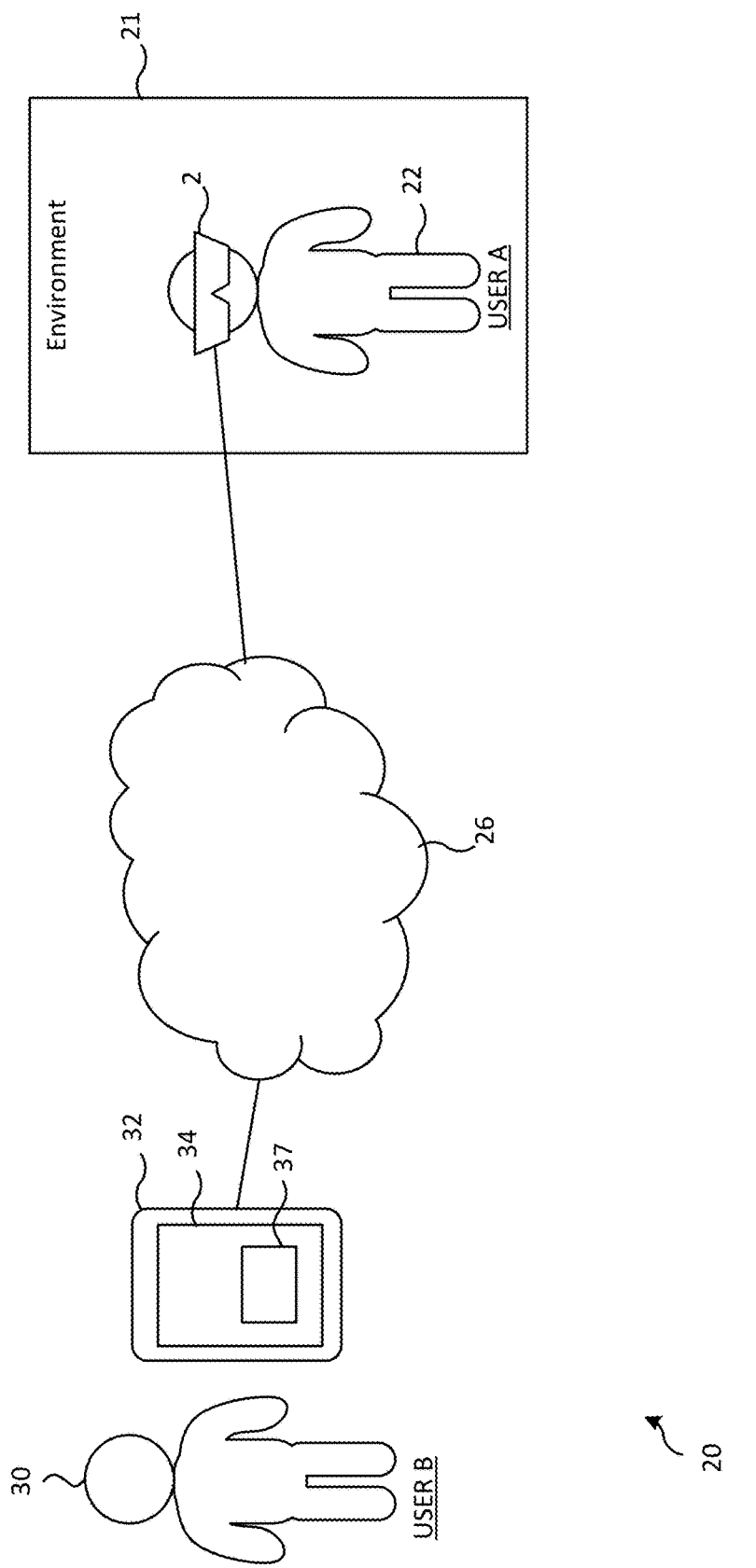
FIG. 3 shows a communication system.

Returning briefly to FIG. 1, the code 9 includes a communication client 36 ("AR client") for effecting communication events via a communications network 26 in a communication system 20 (see FIG. 3). The communication client 36, when executed on the AR device 2, enables the AR device 2 to establish real-time video communication events such as real-time video calls, instant messaging sessions, screen sharing or whiteboard sessions, etc., via the network 26, with another user(s) of the communication system 20 operating their own devices running their own version of the communication client software.

FIG. 3 shows another user 30 ("User B"), who is a far-end user from the perspective of the AR user 22 ("User A"). The far-end user 30 is operating a user device ("companion device") 32, which is shown to be connected to the network 26 and to be executing its own version of the client software 37 ("companion client"). The companion device 32 may, for example, be a smartphone, tablet, laptop or desktop computer device, smart TV or set-top box, games console etc. Also connected to the network 26 is the AR device 2, worn by the AR user 22 located in a real-world environment 21.

Call audio and video data is transmitted and received over the network 26 during an established communication event. The communication is "real-time" in the sense in that there is only a short delay, for instance about 2 second or less, between audio/video being captured at a near-end device and received and outputted by a far-end device. The client may for example be a stand-alone software application that is executed on a processor of the relevant device and runs on top of an operating system, or a plugin to another application executed on the processor such as a Web browser.

The communication system may be based on voice or video over internet protocols (VoIP) systems. These systems are beneficial to the user as they are often of significantly lower cost than conventional fixed line or mobile cellular networks, particularly for long-distance communication. The client software 36, 37 sets up the VoIP connections as well as providing other functions such as registration and user authentication based on, say, login credentials such as a username and associated password.

Returning to FIG. 2A, the encoder and decoder modules 53, 54 of FIG. 3 represent functionality implemented by executing the AR client 36 on the processing apparatus 3. The encoder module 52 receives image data from the cameras 18, audio data from the microphones 13 and transmits those data to the far-end companion device 32 as an outgoing data 55 stream ("first data stream") via the network 26. The decoder 54 receives an incoming data stream 53 ("second data stream") from the far-end device 32, and extracts the far-end user's call audio and video data therefrom.

The AR client 36 and companion client 37 are able to incorporate AR elements into a real-time communication event.

In a video call or other video-based communication event, the AR client 36 displays the video elements of the communication event as 3D augmentations. For example, a 3D augmentation may be rendered visible to the AR user of the AR device 2, which incorporates the far-end user's call video, or an image of what is currently being displayed on shown on their screen or on a shared whiteboard. For example, this element could be rendered so that it is perceived as being projected on a real-world surface, such as a table or wall; or it could be rendered as an apparently free-standing element at a particular location that the AR user can walk towards, away from and around. The decoder 54 generates, from the video data extracted from the incoming data stream, one or more call augmentation data objects "CA", which it supplies to the rendering module 42. The 2D surface data of the call object CA include at least part of the video data, so that the video data is displayed as surface texture of the call object CD when rendered by the rendering module 42.

In the example of FIG. 2A, call augmentation data objects CA are also supplied to the scene modifier 48, which selectively modifies them according to a process described in detail below. The modified call object(s) CA' are supplied to the encoder, and transmitted to the companion device 32 in the outgoing data stream 53. In other cases, the call data objects are not modified at the AR device 2 because they are modified at the companion device 32 instead, and are supplied to the encoder 52 unmodified for transmission in the same manner (see below)—in this case, the scene modifier 48 may be omitted from the AR device 2, or at least not utilized.

The far-end user can also add their own augmentations, such as annotations, via a user interface of the companion device 32 by creating a suitable augmentation data object "RA" at the companion device 32 via a user interface of the companion client 37. The data object RA is transmitted to the AR device 2 in the incoming video stream 53. The decoder 54 extracts the remotely generated augmentation data object RA, and supplies it to the rendering module 42 for rendering in the same manner.

To be able to add annotations in this manner, the companion device 32 also needs access to the surface structure of the part of the environment being annotated. The encoder 54 therefore includes a version of the local mesh LM in the outgoing stream 55.

The AR user can also create their own augmentations via a user interface of the AR device 2. The user interface of the AR device may for example comprise a "natural" user interface (NUI). An NUI enables the user to interact with a device in a natural manner, free from artificial constraints imposed by certain input devices such as mice, keyboards, remote controls, and the like. Examples of NUI methods include those utilizing, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking etc.

In response to the user inputs, the local augmentation module 44 creates a local augmentation data object "LA" according to the user inputs. This data object LA is supplied to the rendering module 42 for rendering in the same manner as the call and remote data objects CA, RA. The local augmentation object is also provided to the encoder 52, which includes it in the outgoing data stream.

In a conventional video call, each device would normally capture video of its respective user and transmit it to the other call participant(s). However, here, the AR client 36 captures a moving image of the real-world view currently visible to the AR user instead, as captured using the cameras 18L, 18R on the headband 3, and transmits the moving image to the companion device 32 via the network 26 as a video signal. The companion client 37 received the video signal and displays it on a display of the companion device 32. The companion client 37 also renders any augmentations created by the far-end user 30 that are currently being perceived by the AR user, in the manner that they are currently being perceived, and displays them on the display 34 overlaid on the real-world image so as to provide a full representation of the AR user's AR "world".

Local data objects AR transmitted to the companion device 32 in the outgoing data stream are rendered by the companion device, and overlaid on the real-world image on the display 34. The pose vector of the device as generated by the tracking module 50 is also communicated to the companion device 32 in the outgoing stream for use by the companion device in displaying the AR user's world.

Figure 2B:
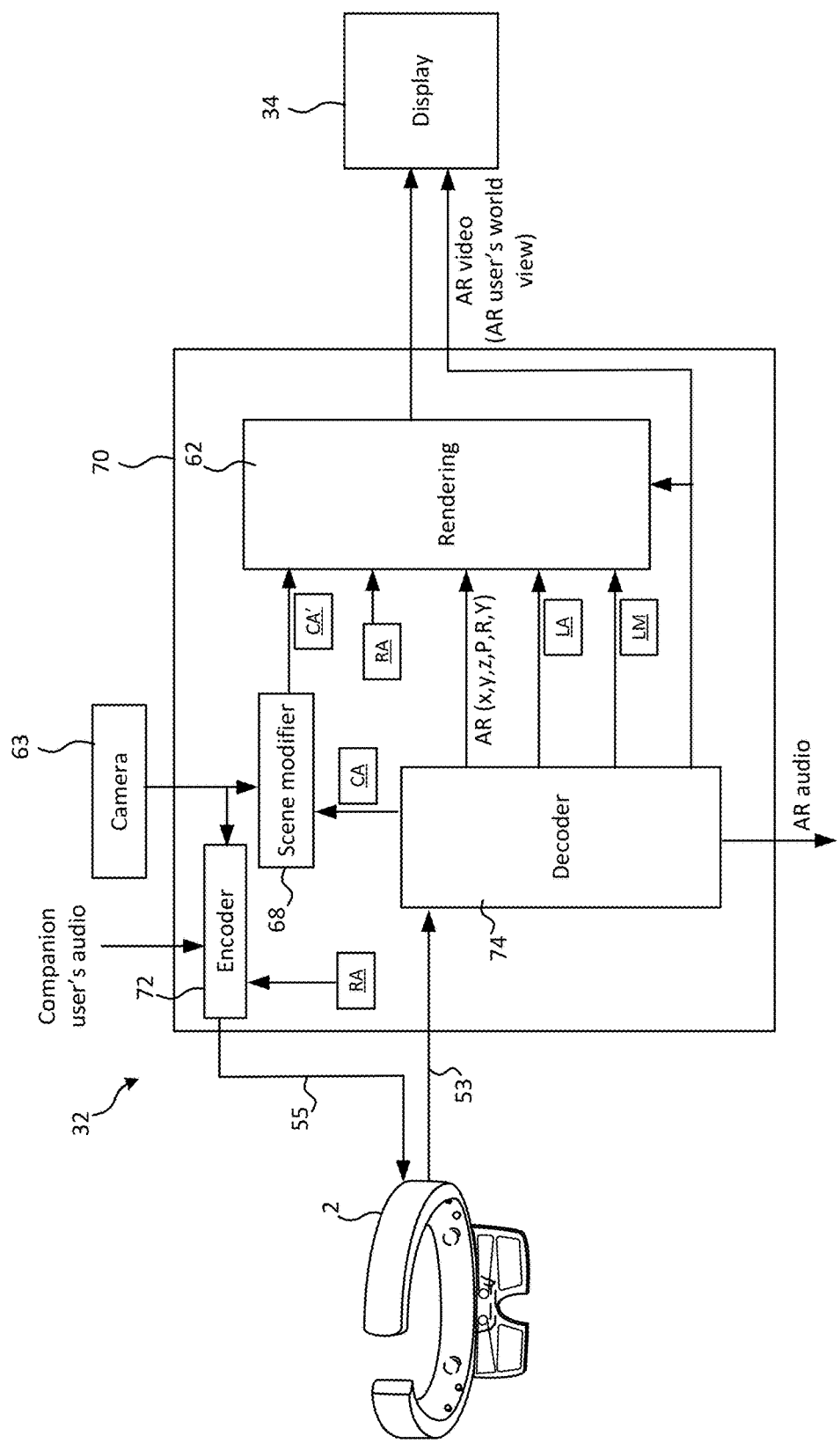
FIG. 2B shows functional modules of a companion device.

FIG. 2B shows a shared reality system 70 of the companion device 32. The shared reality system 32 comprises the following functional modules of the companion device 32, which are software modules of the companion client 37 i.e. they represent functionality implemented by executing the companion client 37 on the companion device 32: a rendering module 62, a scene modification module 68, an encoder 72, and a decoder 74.

The encoder 72 generates the second data stream 55, which is an outgoing data stream from the perspective of the companion device 32. The encoder receives a moving image of the companion user 30 (i.e. the companion user's call video) from a camera 60 of the companion device 32, and transmits it to the AR device 2 in the second data stream together with the companion user's call audio data captured with a microphone of the companion device 32 (not shown). Though not show in FIG. 2B, the shared reality system 70 of the companion device 32 comprises additional functional modules to implement the functionality described above, whereby the companion user 30 can create their own augmentations (e.g. annotations) RA to be applied to the AR user's world, by inputting suitable user inputs via the user interface of the companion device 32.

The decoder 74 receives the first data stream 53 generated by the AR device 2, which is an incoming data stream from the perspective of the companion device 32. The decoder extracts from the first data stream 53 the following:
1. the current pose vector (x, y, z, P, R, Y) of the AR device 2;
2. any augmentation data objects LA that have been generated at the AR device 2 by the AR user 22;
3. the 3D mesh LM as generated at the AR device 2;
4. any call augmentation data objects CA generated at the AR device 2, which may or may not have been modified thereat, as mentioned—in the example of FIG. 2B they are not modified at the AR device so are received in their unmodified form;
5. the AR user's call video as captured at the AR device 2, which as mentioned shows the AR user's view of the environment 21 (not the AR user 22, in contrast to a conventional video call);
6. the AR user's call audio, which is supplied to a loudspeaker of the companion device 32 (not shown).

1 to 3 are supplied to the rendering module 62; the call augmentation data object(s) are supplied to the scene modifier 68 of the companion device 32 in this example, which selectively modifies them and supplies the modified version(s) CA' to the rendering module. Alternatively, in some cases where they are modified at the AR device 2, the call augmentation data object(s) are not modified at the companion device 32, and is supplied to the rendering module 62 directly (see below).

The rendering module 62 also receives any augmentation data objects LA generated at the companion device 32.

The rendering module 62 of the companion device is similar to the rendering module 42 of the AR device 2, in that it uses the pose vector and the 3D model LM to render the three types of augmentation (CA', LA, RA) on the display 34. An important difference however it that the AR user's call video is also displayed on the display, and the objects are rendered overlaid on the call video so as to recreate the scene being perceived by the AR user 2, as mentioned above. That is, the AR user's video is used to simulate the view of the real-world that is visible to that AR user naturally though the transparent optical components of the AR device 2. The video may also in some cases be used in the rendering of the augmentations LA, CA', in addition to the pose vector and local model (though this may unnecessary in some cases).

Moreover, where the companion device does not provide stereoscopic functionality, the simulated view is rendered as a conventional 2D image, for example on a tablet or smartphone display screen.

As indicated above, a particular type of call augmentation CA is a video window ("video card"), in which the companion user's call video as captured at the companion device is displayed to the AR user 2 at the AR device 22.

This can cause an issue at the companion device. The AR user will see the incoming video of the remote companion device user appear in their world. At the companion device the user will see their transmitted video appear in the AR user's world, whenever it is within the field of view of the AR user 22. Depending on network conditions and processing speed of the AR device 2, this could be out of sync with the user of the companion device and thus be distracting.

Figure 4A:
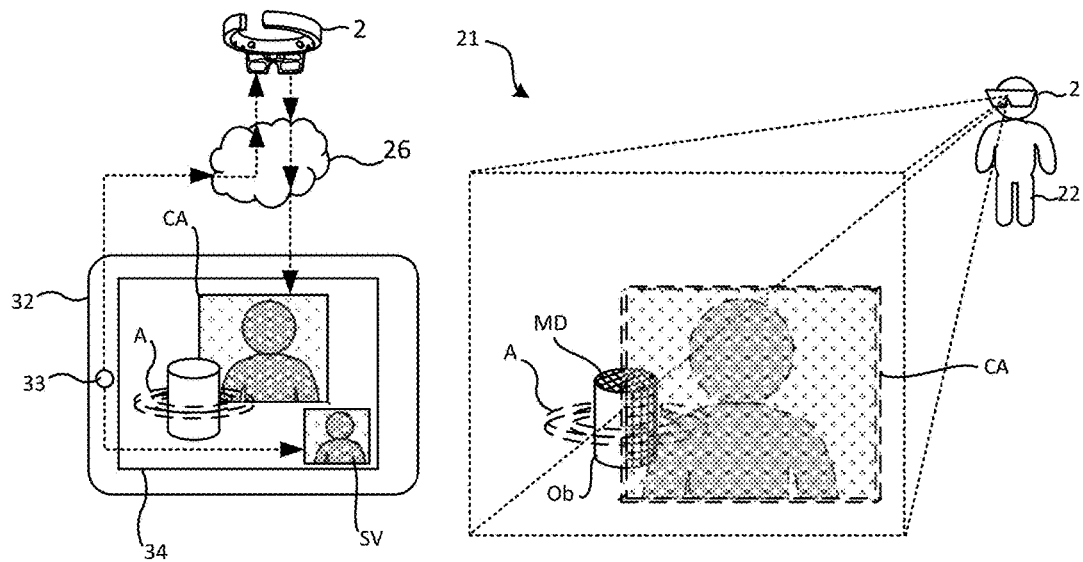
FIG. 4A illustrates an issue that can arise in a shared reality communication event.

To aid illustration, consider FIG. 4A, the right hand side of which shows a virtual video window CA visible to the AR user 22 in their environment 21. The video window is perceived by the AR user as if it were a real-world object, in the sense that has a perceived location in 3D space and a real-world (i.e. physical) object Ob between the AR user 22 and the video window's perceived location is perceived as partially obscuring the video window CA, though suitable rendering of the video window CA based on 3D mesh data MD of the object Ob. An annotation A surrounding the object Ob is also visible to the AR user 2, which they may have created themselves (i.e. "LA") or which the companion user 32 may have created and sent to them (i.e. "RA").

FIG. 4A illustrates a scenario in which an unmodified version of the video window CA is displayed at the companion device 32.

The image data defining the 2D surface structure of this call augmentation data object CA comprises one or more video images (i.e. frames) of the companion device's call video.

The companion device 30 renders the call window CA on its display 34 the as it is perceived by the AR user, as shown to the left of FIG. 4A. The AR user's video is also displayed at the companion device 34, as is the annotation A. The annotation A and video window CV are displayed on top of the moving image, but rendered in a manner that the annotation A is perceived by the companion user 30 as surrounding the object Ob in the video and the call window CA perceived as behind the object in the video (just as they appear to the AR user 22), by suppressing parts of it based on the 3D mesh data MD received from the AR device 2.

The call window CA as rendered at the companion device 32 includes an unmodified version of the video of the companion user 30 that was captured by the device. By the time any given frame of this video is displayed, it will have traversed the network 26 twice—to the AR device 2 and back again. It is therefore likely to be noticeably out of sync due to delays within the network and at the AR device 2 i.e. the companion device user 30 will see themselves as they appeared a few seconds ago, which is a distraction. This is effect is exacerbated in the case that the companion device displays a "self-video" SV i.e. the video of the companion user 30 that is transmitted to the AR user 2, but taken directly from the camera 33 of the companion device 32 (direct in the sense that it has not been transmitted via the network 26) and displayed generally at a corner of the display 32 in a small portion of its display area. Because it is taken directly from the camera 33, the self-video SV will not be subject to the same delays, and will thus be noticeably ahead of the video in the video window CV i.e. the two versions of the companion device's call video will be out of sync.

To address this issue, the call augmentation data object CA is modified—at the AR device 2 by its scene modifier 48, or at the companion device by its scene modifier 68, or even at both devices—to remove the video image(s) of the companion user's call video. An icon or alternative UI component that represents the video is presented in place of the call window at the same perceived location, so that the companion user 32 doesn't see time delayed video of themselves when viewing the AR user's world remotely, whilst still providing the companion device user with information regarding the gaze of the AR user and what they are perceiving.

Figure 4B:
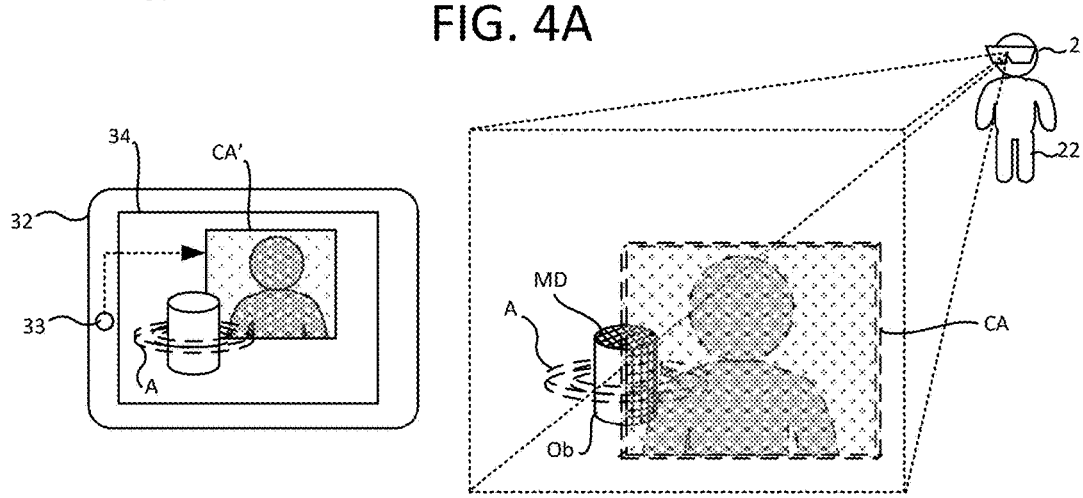
FIG. 4B illustrates a first technique by which this issue can be addressed.

In a first example, illustrated in FIG. 4B, the call augmentation data object CA is modified at the companion device 32 to replace each video image (i.e. frame) of the companion user's call video that has traversed the network twice with a more recently captured video image (i.e. frame) taken directly from the camera 33 of the companion device, thereby eliminating the delay. The modified version of the video window CA' is displayed at the same perceived location in the scene as the original CA, using the location data in the call augmentation data object CA received from the AR device 2.

In some cases, the call augmentation data object CA is also modified at the AR device—for example, the video image(s) of the companion user 32 may be removed at the companion device before transmission, to reduce its size (in bits) and thus use less bandwidth for its transmission. An additional modification is then performed at the companion device 32 to insert the local video received taken directly from its camera 33.

The self-video SV is selectively suppressed in this first example. At the companion device, the companion device user 30 will only see the modified version of the video card CA' in the 3D space when it is in the field of view of the AR user. When the video window SV is not visible to the companion device user 30 because the original version CV is not in the AR user's field of view, it is desirable to retain the self-video SV, so that the companion user 30 can see their own video (in keeping with existing video call systems). However, when the original video window CA is in the field of view of the AR user 22, and thus the modified version CV' is visible on the display of the companion device in the version of the scene displayed thereat, the self-video would be redundant, and is therefore suppressed i.e. not displayed.

Figure 4C:
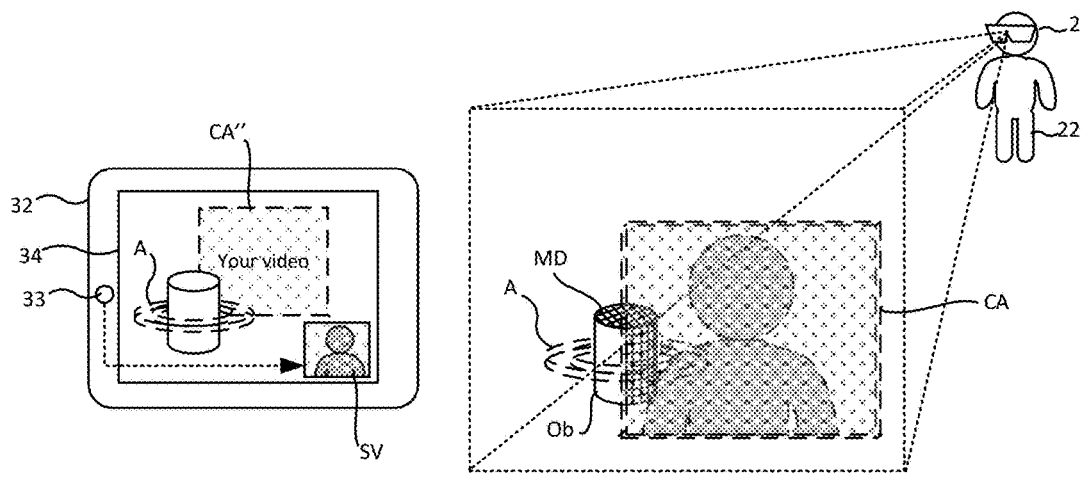
FIG. 4C illustrates a second technique by which this issue can be addressed.

In a second example, illustrated in FIG. 4C, the video image of the companion user 30 is removed entirely, and the modified version of the call window CV is in the form of an icon CA" (which does not include any video image of the companion user's call video) that is displayed at the companion device 32 at the same perceived location in the scene. The video image can be removed at either device, though by removing it at the AR device 2 prior to transmission bandwidth can again be saved. In this second example, the self-video is not suppressed.

Note in alternative implementations, the modification could be performed at an intermediate network node such as a relay server or peer-to-peer node (e.g. a user device hosting a group call in a group call scenario).

Whilst in the above, call augmentation data objects CA are modified at the AR device to implement the subject matter, the same results can be achieved in other ways—for example by generating a separate call augmentation data object to transmit to the companion device, or other data describing the call augmentation (e.g. where an icon is used, the rendering data sent to the companion device may simply be an identifier of the perceived location of the call augmentation CA as this may be all the companion device needs to correctly place the icon).

Whilst in the above, a locally generated mesh LM is used by the devices, alternatively or in addition a mesh of the environment 21 received (e.g. downloaded) from the network could be used by either or both devices.

In a first aspect, a user device comprises: a network interface configured to receive a video signal from another device via a network; a rendering module configured to control display apparatus of the user device to display a virtual element to a user of the user device, the virtual element comprising a video image derived from the video signal; and a scene modification module configured to generate rendering data for displaying a modified version of the virtual element at the other device, wherein the modified version does not include said video image, wherein the network interface is configured to transmit the rendering data to the other device via the network.

In embodiments, the virtual element may be displayed by the rendering module at a perceived location in a visual scene visible to the user, and the rendering data may identify the perceived location so that the other device can display the modified version of the virtual element at the same perceived location in a version of the visual scene displayed at the other device.

For example, the virtual element may be a virtual video window and the modified version of the virtual element may be an icon to be displayed at the same perceived location.

The virtual display element may be displayed to the user as a stereoscopic image element having perceived 3D structure.

The display apparatus may be arranged to provide a real-world view to the user of their environment, the visual scene being rendered visible by displaying the virtual element so that it is visible simultaneously with the real-world view.

For example, the display apparatus may comprise a substantially transparent viewing portion through which the real-world is visible and thereby provide the real-world view, the substantially transparent viewing portion being arranged to project an image of the virtual element onto an eye of the user.

In addition, the user device may comprise a camera input configured to receive from at least one camera of the user device a moving image of the real-world view visible to the user, wherein the network interface may be configured to transmit the moving image to the other device so that the other device can display the moving image and the modified version of the virtual element at the perceived location in the displayed moving image.

Alternatively or in addition, the user device may comprise a modelling module configured to generate a 3D model of the user's environment using sensing apparatus of the user device, wherein the network interface may be configured to transmit the 3D model to the other device for use in rendering the modified version of the display element at the other device.

The user device may comprise a location tracking module configured to measure a current location and/or orientation of the user device, wherein the network interface may be configured to transmit an identifier of the current location and/or orientation of the user device to the other device for use in rendering the modified version of the display element at the other device.

A second aspect is directed to a method of effecting a shared reality communication event between a first user of a first device and a second user of a second device via a communication network, in which the first device renders visible to the first user a visual scene by displaying virtual elements to the first user, and the second device displays to the second user a version of the visual scene as it is being perceived by the first user, the method comprising: receiving rendering data for displaying at the second device a version of a virtual element that is currently being displayed at the first device in the visual scene; detecting when the rendering data comprises a video image that was captured at the second device and transmitted via the network to the first device; modifying the rendering data to remove said video image; and providing the modified rendering data to a rendering module of the second device, thereby causing the second device to display in its version of the visual scene a modified version of the virtual display element which does not include said video image.

In embodiments, the modification step may be performed at the second device by replacing said video image with a more recently captured video image received directly from a camera of the second device.

For example, the method may comprise detecting when the virtual element is no longer visible in the version of the visual scene displayed at the second device, and in response displaying at the second device a self-image display element which comprises a video image received directly from a camera of the second device, wherein the self-image display element may only be displayed at the second device when the virtual element is not visible in the version of the visual scene displayed at the second device.

Alternatively, the modification step may be performed by replacing said video image with an icon.

For example, the method may comprise displaying simultaneously with the icon at the second device a self-image display element which comprises a video image received directly from a camera of the second device.

The method may comprise receiving at the second device via the network from the first device element location data, wherein the element location data may define a location of the virtual element as perceived by the first user in the visual scene, wherein the modified version of the virtual display element may be displayed at the same perceived location in the version of the scene displayed at the second device.

The method may comprise: receiving at the second device a 3D model of the first user's environment; and using the received 3D model to render the modified version of the virtual element at the second device.

The method may comprise: receiving at the second device an identifier of a current location and/or orientation of the first device; and using the received 3D model to render the modified version of the virtual element at the second device.

In embodiments, any of the method steps disclosed herein may be implemented as functional modules of a device, and vice versa.

In a third aspect, a computer program product comprises code stored on a computer readable storage medium and configured when executed on a user device to implement the method of the second aspect, or any embodiment thereof.

Generally, any of the functions described herein can be implemented using software, firmware, hardware (e.g., fixed logic circuitry), or a combination of these implementations. The terms "module," "functionality," "component" and "logic" as used herein, such as the functional modules of FIGS. 2A and 2B, generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the AR or companion devices (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system comprising:
one or more processors; and
one or more computer-readable storage devices storing code that is executable by the one or more processors to cause the system to perform operations including:
receiving an image of a real-world view of an environment in which a user of a user device is positioned;
receiving a video signal from another device;
controlling a display apparatus of the user device to display a virtual element in a visual scene visible to the user of the user device, the virtual element comprising a video image derived from the video signal, and the visual scene including the image of the real-world view of the environment along with the virtual element; and
generating rendering data for displaying a modified version of the virtual element and the image of the real-world view of the environment at the other device, wherein the modified version does not include said video image; and
transmitting the rendering data for receipt by the other device.

2. A system according to claim 1, wherein the virtual element is displayed at a perceived location in a visual scene visible to the user, and the rendering data identifies the perceived location so that the other device can display the modified version of the virtual element at the same perceived location in a version of the visual scene displayed at the other device.

3. A system according to claim 2, wherein the virtual element is a virtual video window and the modified version of the virtual element is an icon to be displayed at the same perceived location.

4. A system according to claim 2, wherein said controlling the display apparatus comprises causing the virtual element to be displayed on the display apparatus so that it is visible simultaneously with the real-world view.

5. A system according to claim 4, wherein the image of the real-world view comprises a moving image of the real-world view, and wherein said generating comprises generating the rendering data to include the moving image of the real-world view so that the other device can display the moving image of the real-world view and the modified version of the virtual element at the perceived location in the moving image of the real-world view.

6. A system according to claim 4, wherein the operations further include generating a 3D model of the environment in which the user of the user device is positioned using sensing apparatus, and transmitting the 3D model to the other device for use in rendering the modified version of the virtual element at the other device.

7. A system according to claim 4, wherein the display apparatus comprises a transparent viewing portion through which the environment in which the user of the user device is positioned is visible and thereby provides the real-world view, the transparent viewing portion being arranged to project an image of the virtual element onto an eye of the user.

8. A system according to claim 1, wherein the virtual element is displayed to the user as a stereoscopic image element having perceived 3D structure.

9. A system according to claim 1, wherein the operations further include determining one or more of a current location or a current orientation of the user device, and transmitting an identifier of the one or more of the current location or the current orientation of the user device to the other device for use in rendering the modified version of the virtual element at the other device.

10. A computer readable storage device storing code that is executable by a processing system to perform operations comprising:
receiving an image of a real-world view of an environment in which a user of a user device is positioned;
receiving a video signal from another device;
controlling display apparatus of the user device to display a virtual element in a visual scene visible to the user of the user device, the virtual element comprising a video image derived from the video signal, and the visual scene including the image of the real-world view of the environment along with the virtual element;
generating rendering data for displaying a modified version of the virtual element and the image of the real-world view of the environment at the other device, wherein the modified version does not include said video image; and
transmitting the rendering data for receipt by the other device.

11. A computer readable storage device according to claim 10, wherein the virtual element is displayed at a perceived location in a visual scene visible to the user, and the rendering data identifies the perceived location so that the other device can display the modified version of the virtual element at the same perceived location in a version of the visual scene displayed at the other device.

12. A computer readable storage device according to claim 11, wherein the virtual element is a virtual video window and the modified version of the virtual element is an icon to be displayed at the same perceived location.

13. A computer readable storage device according to claim 10, wherein the virtual element comprises a stereoscopic image element that simulates a 3-dimensional (3D) structure.

14. A computer readable storage device according to claim 10, wherein the operations further comprise:
generating a 3-dimensional (3D) model of the environment in which the user of the user device is positioned; and
transmitting the 3D model for receipt by the other device and for use in rendering the modified version of the virtual element.

15. A computer readable storage device according to claim 10, wherein the operations further comprise:
determining one or more of a location of the user device or an orientation of the user device to generate one or more of location data or orientation data; and
transmitting one or more of the location data or orientation to for receipt by the other device and for use in rendering the modified version of the virtual element.

16. A method comprising:
receiving an image of a real-world view of an environment in which a user of a first device is positioned;
receiving a video signal the first device from a second device;
controlling display apparatus of the first device to display a virtual element in a visual scene visible on the first device, the virtual element including a video image derived from the video signal, and the visual scene including the image of the real-world view of the environment along with the virtual element;
generating rendering data for displaying a modified version of the virtual element and the image of the real-world view of the environment at the second device, the modified version not including the video image; and
transmitting the rendering data for receipt by the second device.

17. A method as recited in claim 16, wherein the virtual element is displayed at a particular location at the first device, and wherein the rendering data identifies the location.

18. A method as recited in claim 16, wherein the virtual element is a virtual video window displayed at a particular location in a scene at the first device, the modified version of the virtual element is an icon, and wherein the rendering data indicates that the icon is to be displayed at the same particular location in a scene at the second device.

19. A method as recited in claim 16, further comprising:
generating a 3-dimensional (3D) model of an environment of the first device; and
transmitting the 3D model for receipt by the second device and for use in rendering the modified version of the virtual element.

20. A method as recited in claim 16, further comprising:
measuring one or more of a location of the first device or an orientation of the first device to generate one or more of location data or orientation data; and
transmitting one or more of the location data or orientation to for receipt by the second device and for use in rendering the modified version of the virtual element.

* * * * *